United States Patent [19]
Wrabel

[11] Patent Number: 5,788,075
[45] Date of Patent: Aug. 4, 1998

[54] JACKETS AND METHODS FOR MAKING SAME

[76] Inventor: George W. Wrabel, 2608 Dering Gate, Marietta, Ga. 30066

[21] Appl. No.: 714,234

[22] Filed: Sep. 16, 1996

[51] Int. Cl.⁶ .......................... B65D 85/57; B65D 85/67
[52] U.S. Cl. ........................ 206/455; 206/308.1
[58] Field of Search .................. 40/704; 156/244.23, 156/272.6; 206/455, 456, 308.1; 383/54

[56] References Cited

U.S. PATENT DOCUMENTS

| | | | |
|---|---|---|---|
| 1,959,460 | 5/1934 | Crossan | 156/244.12 |
| 2,775,050 | 12/1956 | Ellsworth | 40/159 |
| 2,861,370 | 11/1958 | McArthur | 40/159 |
| 2,889,647 | 6/1959 | Roman | 40/159 |
| 3,008,862 | 11/1961 | Haine et al. | 156/244 |
| 3,071,881 | 1/1963 | Ruterbusch | 40/158 |
| 3,130,647 | 4/1964 | Anderson et al. | 93/35 |
| 3,166,458 | 1/1965 | Chinn et al. | 156/295 |
| 3,238,655 | 3/1966 | Englestein | 40/159 |
| 3,481,818 | 12/1969 | Wellen | 161/2 |
| 3,518,978 | 7/1970 | Kappelhoff et al. | 383/54 |
| 3,519,706 | 7/1970 | Pantsios | 264/143 |
| 3,553,439 | 1/1971 | Dorman | 235/61.12 |
| 3,616,019 | 10/1971 | Mueller-Tamm | 156/244 |
| 3,644,606 | 2/1972 | Auge et al. | 264/47 |
| 3,661,675 | 5/1972 | Frankowski | 156/285 |
| 3,705,464 | 12/1972 | Dahl, Jr. | 40/105.5 |
| 3,716,434 | 2/1973 | Cook et al. | 156/157 |
| 3,736,680 | 6/1973 | Dahl, Jr. | 40/105.5 |
| 3,755,937 | 9/1973 | Anderson | 40/78.15 |
| 3,773,590 | 11/1973 | Morgan | 156/244 |
| 3,866,648 | 2/1975 | Anderson | 150/39 |
| 3,932,248 | 1/1976 | Keaton | 156/210 |
| 4,096,013 | 6/1978 | Lutzmann et al. | 156/272.6 |
| 4,471,545 | 9/1984 | Dorman | 40/159 |
| 4,523,401 | 6/1985 | Dorman | 40/159 |
| 4,523,666 | 6/1985 | Dorman | 156/243 |
| 5,374,975 | 12/1994 | Amat | 206/455 |
| 5,431,449 | 7/1995 | Arimoto et al. | 206/455 |
| 5,436,694 | 7/1995 | Ishikawa et al. | 206/455 |
| 5,459,549 | 10/1995 | Barr | 206/455 |

*Primary Examiner*—Jimmy G. Foster
*Attorney, Agent, or Firm*—Robert W. Strozier; J. M. (Mark) Gilbreth; Gilbreth & Strozier, PC

[57] ABSTRACT

A transparent jacket designed to accommodate objects such as microfilm strips, CDs, diskettes and the like. The disclosed jackets are formed of top and bottom panels of flexible synthetic plastic material and bonding members that partition the jackets into chambers where the bonding members are composed of a hot melt adhesive system bonded to ozone pre-treated regions of the panels. The bonding members can be a plurality of longitudinal members substantial parallel to each other or at least one longitudinal and at least one lateral member where the longitudinal members are substantially parallel and the lateral members are substantially parallel. Each chamber is closed on at least two sides and includes a slot in one of the panel for inserting the object into the chamber. The bonding member are of a thickness designed to accommodate the object the jacket was designed to retain.

18 Claims, 4 Drawing Sheets ized and activates the surface of the web to improve the adhesive bonding characteristics thereof. Rib-

5,788,075

JACKETS AND METHODS FOR MAKING SAME

BACKGROUND OF THE INVENTION

1. Field of the Invention

The present invention relates generally to jackets having at least one channel or chamber for receiving, storing and protecting substantially flat objects such as microfilm strips, CDs, optical disks, diskettes and to methods for making same.

More particularly, the present invention relates to improved jackets, especially microfilm jackets, and to methods for making same. The jackets include top and bottom transparent members and a plurality of adhesive bonds bonded to an ozone pre-treated surface of the members to create a plurality of longitudinal channels or chambers separated one from the other by the bonds. The chambers are designed to receive, store and protect substantially flat objects such as microfilm strips. The method includes the steps of pre-treating the transparent members with ozone prior to applying a plurality of ribbons or bands of a fully melted hot melt adhesive system to the members and passing the laminant through a compression zone to ensure good adhesive contact between the adhesive system and the ozone pre-treated surfaces of the members.

2. Description of the Related Art

U.S. Pat. No. 3,238,655 discloses a microfiche master composed of a transparent jacket formed by two transparent plastic panels laminated together by ribs, which are spaced to define a series of parallel channels or chambers adapted to accommodate microfilm strips. The loaded, multi-chambered jacket functions as a microfiche master from which reference copies may be made. This is affected by contact-printing through the front panel which is quite thin, the back panel being thicker to impart body to the jacket. Such microfiche masters are highly useful in storing and disseminating information. This patent further discloses that to facilitate contact-printing, it is important that the top panel be thin to minimize the separation between the sensitive film of the contact-printer and the microfilm strip in the jacket, so as to obviate a loss of optical definition. It is also essential to avoid any space between the filmstrip and the overlying top panel. Since this spacing is determined by the ribs, which separate the top panel from the bottom panel of the jacket, the thickness of the ribs is made substantially equal to the thickness of the standard microfilm, which is 5.5 mils. Thus, the film strip is snugly received within the chamber.

U.S. Pat. No. 3,553,439 discloses a microfiche master having magnetic tracks which include two panels of transparent polyester bonded together by pre-formed ribs of a plastic material, where the pre-formed ribs are bonded to the panels using a hot melt adhesive. The ribs defined microfilm strip insertion channels and one rib incorporating magnetizable material.

U.S. Pat. No. 3,866,648 discloses a sonic welding process for making microfilm jackets including top and bottom panels and dividing members where the members are formed by sonically welding the two panels together along longitudinal weld lines.

U.S. Pat. Nos. 4,452,666, 4,471,545, and 4,523,401 disclose jackets and methods for making same, where the jacket includes top and bottom transparent panels and a plurality of ribs of a moldable material compatible with the panels and where the ribs are formed in situ and are integrally bonded to each panel free of adhesive and other bonding agents.

U.S. Pat. No. 4,866,864 discloses a microfilm jacket also including top and bottom panels, a plurality of in situ ribs and where the panels are mechanically serrated prior to application of the in situ ribs to improve bonding.

Although the jackets and methods for making the jackets disclosed above make acceptable products, better manufacturing technology and product durability is always needed. Thus, it would be an advancement in the art to have jackets, such as microfilm jackets, where the bonds are made of an adhesive system applied to ozone pre-treated surfaces of the top and/or bottom transparent members, where the ozone pre-treatment and the adhesive system work in conjunction to enhance adhesion, to improve manufacturing efficiency, and to increase the operating temperatures for making the jackets.

SUMMARY OF THE INVENTION

The present invention provides a transparent jacket including top and bottom transparent members having one ozone pre-treated surface, a plurality of adhesive bonds interposed between the top and bottom members and extending longitudinally the length of the jacket. The bonds partition the jacket to form a plurality of open-ended chambers or channels designed to receive an object of a predetermined three-dimensional configuration. The bonds are formed from parallel ribbons of a hot melt adhesive system applied to the ozone pre-treated surfaces of the transparent members and where the bonds are preferably equi-spaced to form essentially identical chambers. Additionally, the jackets can include a plurality of laterally extending bonds so that the jacket has a plurality of chambers having only a single or no open end.

The present invention also provides methods and apparatus for making the jackets. The methods include pre-treating one surface of two continuous webs of a transparent material with ozone. The ozone pre-treatment chemically and physically alters and activates the surface of the web to improve the adhesive bonding characteristics thereof. Ribbons of a fully melted hot melt adhesive system are then deposited directly onto the ozone pre-treated surface of at least one web and the webs are then combined so that the ribbons are interposed therebetween.

The ribbons are deposited on the webs by pumping the fully melted hot-melt adhesive system from a heated holding tank to a dispensing manifold or head through a heated conduit. The dispensing manifold or head has a plurality of dispensing nozzles through which the fully melted, hot melt adhesive system is pumped. The nozzles are positioned vertically with respect to the ozone pretreated surface of at least one web at a distance from the surface that is less than the height of the resulting ribbons. The ribbons are deposited so that they extend substantially parallel to the edges of the web and to each other. When the adhesive system is applied to one web which is then overlaid with the second web, the ribbons assume a substantially flat configuration after being pumped onto the web surface where the height and width of the ribbons are substantially similar to the height and width of the resulting bonds. The ribbons are designed to form the bonds which partition the jackets into the chambers upon cooling. Alternatively, the manifold can be positioned such that the nozzles direct the ribbons into a V formed at an entry of a nip of a compression zone. Moreover, two manifolds can be used to direct ribbons onto each web prior to passing the webs through the nip of the compression zone.

The ozone pre-treated webs with the ribbons therebetween are then passed through the compression zone formed between a chilled roller and an un-chilled roller to form a laminant. The compression zone presses the two webs together so that the adhesive system comes into good adhesive contact with the ozone activated surfaces of both webs. The ribbon height and thickness, and to some extent the nip of the compression zone, determine the height and width of the bond once the ribbons interposed between the web have cooled.

Because the ribbons are only adhesively bonded to the activated surfaces of the webs, the adhesive system and ozone pre-treated surface must operate in conjunction to ensure that adequate bond strength exists between the adhesive system and the activated surfaces of the webs.

Once the webs with the ribbons interposed therebetween have passed through the compression zone, the ribbons adhesively bond to the webs and cool forming the bonds, which divide the jacket into chambers. The continuous bonded webs are then cut into a desired length at a sheeting unit. Additionally, one web can for a plurality of slots cut therein prior to the application of the ribbons thereto where the slots are designed to facilitate the loading of objects such as microfilm strips, 35 mm film strips, CDs, diskettes, magnetic storage strips or the like.

BRIEF DESCRIPTION OF DRAWING

The invention can be better understood with reference to the following detailed description together with the appended drawings in which like elements are numbered the same.

DETAILED DESCRIPTION OF INVENTION

Figure 1:
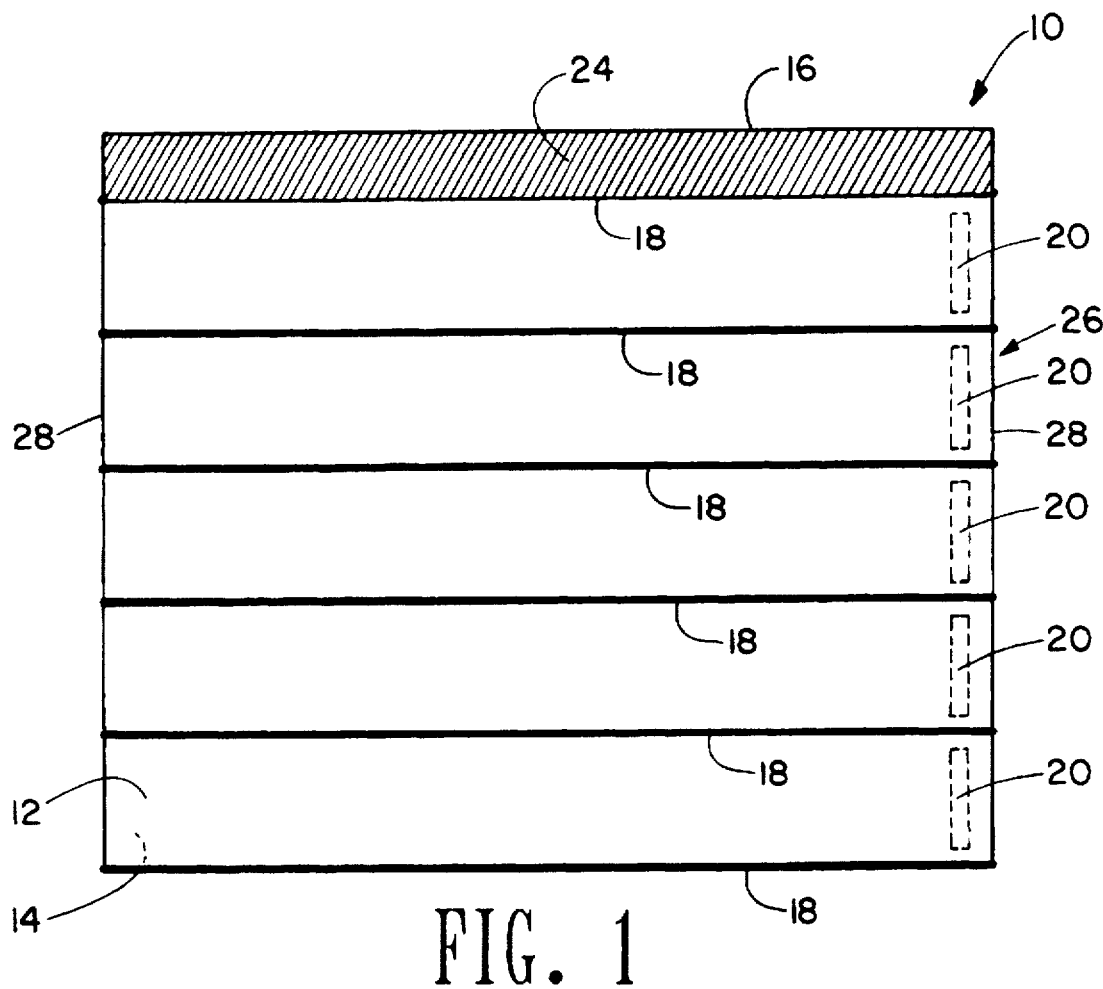
FIG. 1 is a plan view of a multi-channel jacket of this invention.

The inventor has found that a less expensive and more durable retaining jacket can be made from ozone surface pre-treated films of a transparent plastic material bonded together by ribbons of a hot melt adhesive system. The ozone pre-treatment physically and chemically alters and activates the film surface, and preferably only portions thereof, to improve the bonding characteristics of the film surfaces so that a hot melt adhesive system can more effectively bond to the two films to form jacket laminants. The ribbons upon cooling are designed not only to bond the two films together, but also to act as partitions which form chambers designed to receive objects such as strips of material or relatively flat articles including, without limitation, microfilm strips, 35 mm film strips, magnetic strips, CDs, optical disks, diskettes or the like.

One aspect of this invention is to provide a jacket having a plurality of longitudinal chambers suitable for receiving and storing microfilm strips. This type of jacket is formed from top and bottom panels of the same or different transparent polymeric film where one surface is pre-treated with ozone. Preferably, the ozone treatment is directed to portions of the web surface which correspond substantially to the regions of the web onto which the adhesive will be deposited. The panels are held together by bonds of a specific width and thickness made from the cooled ribbons of the hot melt adhesive system. Thus, the jackets of the present invention have at least two closed sides. Microfilm jackets will preferably have two open ends while jackets for other type of objects will preferably have one open end. Of course, all four sides can be closed as well leaving only the insertion slot to insert and remove the object from the chambers of the jackets.

When making jackets for diskettes or CDs, three sides of the chamber are preferably closed: two sides are closed by the longitudinal ribbons; and the third side is closed by either depositing a plurality of closely spaced dots of the hot melt adhesive system oriented perpendicular to the longitudinal ribbons or transferring a layer of the hot melt adhesive onto at least one web from a transfer roller so that the layer(s) is oriented perpendicular to the ribbons. The longitudinal and lateral ribbons are spaced apart a sufficient amount on the web to form chambers of sufficient size to retain the diskette or CD.

The jackets of the present invention are made by a process that includes ozone pre-treating one surface of two polymeric webs and preferably ozone pre-treating only longitudinal regions of the webs so that the ozone pre-treatment will be preferably correspond substantially only with the regions of the webs onto which the hot melt adhesive system will be pumped. Ozone surface modification changes the chemical properties of the web at or near the surface. Because ozone is a very active form of oxygen and is known to react with molecular functional groups or moieties such as unsaturated bonds, aromatic rings, activated groups including carbons bonded to highly electronegative atoms, etc., ozone pre-treatment of the web material will result in ozone induced oxidation and cleaning of the web surface. Such ozonation of the surface is thought to increase the number and type of polar groups at or near the surface including, without limitation, the introduction of aldehydes, alcohols, ketones, carboxylic acids, esters and other polar functionalities and to reduce the amount of finishing oils left on the web surface from the web manufacturing process.

Moreover, because ozone oxidizes the surface and can break polymer chains, the ozone pretreated surface will have different physical properties as well. The changes in physical properties may include changes in film strength, film surface roughness, film tacticity, molecular weight, molecular weight distribution, viscosity, flexibility, and resistance to further oxidation.

Although the jackets of the present invention may be prepared using the same thickness of webs for the top and bottom panels, the preferred jackets, especially for use with microfilm, will include a thick bottom web and a thin top web where the top web is amenable to contact printing.

For microfilm jackets, the bottom web is generally between about 2 mils and about 5 mils with between about 2.5 mils and about 3 mils being preferred; while the top web is generally about 1 mil or less, with between about 0.25 mils and 0.75 mils being preferred. Because microfilm jackets are intended to receive microfilm strips, which come in thicknesses between about 2.5 mils and about 5.5 mils, the bonds derived from the cooled ribbons of the hot melt adhesive system are generally adjusted so that the height of the bond is similar in height to the microfilm strip thickness.

The similarity in height between the bond and the microfilm strips is to ensure that contact printing will not be adversely affected by incomplete conformity of the top web to the top surface of the microfilm strip. These same attributes of the bond would be preferred for any application that involved strips of materials where contact printing is desired on at least one side of the jacket. Generally, the bonds are between about 3 mils thick and about 5 mils thick. Of course, for jackets that do not require contact printing, the bond can be of any desired thickness provided the object to be inserted into the jacket chamber fits adequately well and so that the web adequately protects the surface of the object.

The hot melt adhesive systems of the present invention include at least one synthetic polymeric material or resin and preferably at least one bonding agent where the bonding agent is designed to enhance the bonding of the resin or polymeric material to the ozone pre-treated web surfaces. The term bonding agent, as used in this application, includes any agent that alters and preferably improves the bonding strength of an adhesive bond such as agents that plasticize the resin, improve the wetting of the web surface, increase bond strength between the resin and the web material or enhance the overall lifetime of the adhesive bond holding the webs together.

Generally, the adhesive system includes 100% to about 50% of at least one synthetic resin and from about 0% to about 50% of at least one bonding agent. The preferred adhesive system includes from about 99% to about 60% of at least one synthetic resin and from about 1% to about 40% of at least one bonding agent. The particularly preferred adhesive system includes from about 95% to about 70% of at least one synthetic resin and from about 5% to about 30% of at least one bonding agent.

Suitable synthetic resins for use in the hot melt adhesive systems of the present invention include, without limitation, polyesters, copolyesters, polyamides, polyester-amides, hydrocarbon resins, ethylent-vinylacetate copolymers, styrene-butadiene copolymers, styrene-isoprene copolymers, hydroxylated polystyrene, or other resins, combination and mixtures thereof Suitable bonding agents of use in the adhesive systems of the present invention, include, without limitation, modified phenolics such as Bakelite® CKM 2400 from Georgia Pacific, abitol alcohol esters such as Cellolyn® 21 from Roe Chemical, melamines such as Oymel® 301 from American Cyanamid, expoxy resins such as EPON® 301, 1001, or 1007 from Shell, rosin esters such as Foral® 105 from Hercules, polyketones such as Krumbhaar® K-1717B from Lawter Chemical, isocyanates such as Mondur® CB-75 from Miles, Inc., cellulose nitrates such as Nitrocellulose® RS ¼ sec from Aqualon, amine-formaldehyde resins, hydroxylated polystyrenes such as RJ-100® from Monsanto, arylsulfonamides or alkaarylsulfonanides such as Santolite® MHP from Monsanto, silicon resins such as SR-83M® from General Electric, sucrose benzoate from Velsicol Chemical, trialkyloethane tribenzonate such as trimethylolethane tribenzoate sold by Velsicol Chemicals under the tradename Benzoflex® S-404, polyvinyl butyral from Monsanto sold under the tradename Bulvar® B-90, ethyl cellulose N-7 from Aqualon, an acrylic such as Acryloid®V B-66 from Rohm & Haas, or the like, combinations and mixtures thereof These agents modify and enhance the bonding properties of synthetic resins to web materials including polyester webs such as Mylar®.

The adhesive system preferentially includes a synthetic resin and a bonding agent, especially a copolyester adhesive in conjunction with between about 2% and about 15% of a bonding agent, especially an aryl sulfonamide. Alternately, the jackets can be made by pre-treating stripes of the surface with ozone and then applying an ethylene-vinyl acetate (EVA) based adhesive system containing up to 30 wt. % of a hydrocarbon tackifier. EVA bonded jackets are thought to afford longer life to the jackets because the EVA adhesive system is not subject to water attach as are the copolyesters. Besides an EVA based adhesive system, a polyamide adhesive system can also be used for long life. Neither EVA nor polyamide adhesive systems are subject to a loss of molecular weight due to water attack, i.e., these adhesives are not hydrolytically unstable as are the copolyester adhesives. Of course, other bonding systems such as polyolefins, which are also hydrolytically stable can be used as well.

Suitable polymeric materials for the webs of the present invention include, without limitation, polyesters such as Mylar® from Du Pont, Miiinexg) and Caladex® from ICI America, Celanex® from Hoescht Celanese, cellulose acetate, ABS films, polypropylene such as syndiotactic polypropylene, or like, or combinations and mixtures thereof.

The method of this invention basically involves: (1) pre-treating one surface of a top web and of a bottom web made of a transparent material to activate the surfaces and to improve the adhesive properties of the surface or parts thereof in at least one ozone treating zone; (2) pumping a plurality of parallel, substantially flat ribbons of a fully melted, hot melt adhesive system onto at least one of the pre-treated surfaces of at least one of the webs in at least one hot melt adhesive application zone; (3) laminating the webs with the ribbons interposed therebetween to form a laminant in a compression zone where the ribbons form bonds of a given height and thickness and where the compression zone brings the ozone pre-treated surface of the other web into adhesive contact with the ribbons; and (4) cutting the laminant to a desired size.

All of the above steps are performed while keeping a given amount of tension on the webs. Thus, tension must be applied to the webs as each goes through the various zones or stations. The maintenance of an adequate tension is critical to ensure that the steps of ozone pre-treatment, adhesive application, compression and cutting proceed without off centered pre-treating, off centered cuts, off aligned laminants, and the avoidance other problems associated with the successful manufacture of the jackets.

Each ozone pre-treatment zone preferably directs the ozone primarily at those portions of one surface of each web, which correspond substantially to the portions of the webs that will come into adhesive contact with the hot melt adhesive system. The ozone treating zones are preferably located just prior to when each web comes in contact with the hot melt adhesive. When the adhesive is applied only to the bottom web, then the bottom web ozone applicator is located prior to the adhesive application zone and the top web ozone application is located prior to the compression zone. If the adhesive is actually applied into the V made between the two webs just prior to their entry into the compression zone (i.e., the adhesive simultaneously contacts both webs), then the ozone pre-treating applicator will direct ozone jets directly onto regions of each web prior to the web surfaces coming into adhesive contact with the adhesive system in the compression zone.

Preferably, the ozone applicators are in relative close proximity to either the adhesive applicator head or the nip. The close proximity of the ozone pre-treating applicators to the point at which the web comes in contact with the hot melt adhesive system is to ensure that the activated surface comes in adhesive contact with the hot melt adhesive as soon as is mechanically possible, and preferably immediately, after ozone pre-treatment. Of course, from a mechanical perspective the ozone applicators may be several inches from the point at which the web surfaces contact the adhesive. However, this distance should be generally within about 6 inches and preferably within about 3 inches and especially within about 1 inch or less of when the web surface contacts the adhesive.

The compression zone is designed to bring the adhesive system into firm adhesive contact with the web surfaces to promote enhanced bonding of the hot melt adhesive ribbons to the ozone treated web surfaces so that the resulting laminant will have adequate strength. The compression zone also helps to control the thickness of the final laminant jacket by slightly compressing the flat ribbons of adhesive. However, the ribbons are already substantially in their final form prior to compression having a height generally between about 2.5 mils and 6 mils and a width between about 2 mils and about 5 mils.

The molten hot melt adhesive system is preferably pumped onto the ozone pretreated regions or portions or stripes of the bottom web at a temperature between about 150° C. and about 250° C., and preferably between about 175° C. and about 195° C. Although the temperature range can be expanded to handle higher or lower temperature hot melt adhesive systems, there is a practical upper limit to the application temperature for the hot melt adhesive system. The upper limit is dictated by the lower of the thermal stability of the adhesive system or the glass transition temperature or melt point temperature of the web material. Moreover, the hot melt adhesive system is maintained in the tank generally at a temperature about 10° C. higher than the application temperature and the transfer conduit is generally maintained at or about the application temperature.

The upper limit, therefore, should be sufficiently removed from the lower of the thermal stability of the adhesive system or the glass transition temperature or melt point temperature of the web material to ensure that neither the adhesive nor web material undergoes any adverse changes during the adhesion process. The upper temperature limit for application of the hot melt adhesive system should be about 10° C. to about 20° C. below the lower of the thermal stability of the adhesive system or the glass transition temperature of the web material or if the webs do not have a glass transition temperature, then about 10° C. to about 20° C. below the melt point temperature of the web material.

Figure 2:
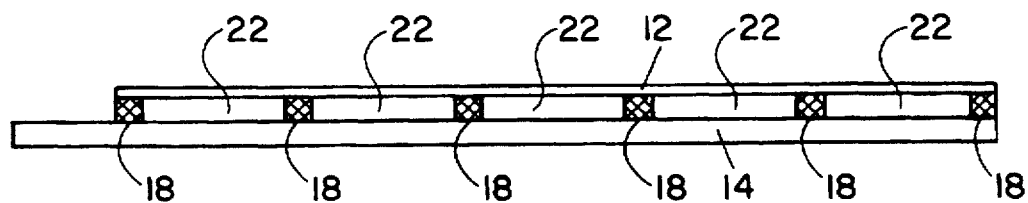
FIG. 2 is a cross-sectional view taken along the line 2—2 in FIG. 1.

Referring now to FIGS. 1 and 2, a microfilm jacket of the present invention is shown generally as 10 which includes a top panel 12, a bottom panel 14, a title strip 16, a plurality of bonds 18 interposed between the panels 12 and 14 and corresponds substantially to ozone pre-treated portions of the panels 12 and 14, a plurality of microfilm strip or chip insertion slots 20 and a plurality of open-ended microfilm holding chambers or channels 22 formed by the bonds 18. The jacket 10 is shaped in the form of a rectangle with the top and bottom panels 12 and 14, respectively, being in a superposed relationship.

These bonds 18 are made of an adhesive system comprising a synthetic resin or polymeric material and at least one bonding agent. The adhesive system must be capable of adhesively bonding to the ozone activated portions of the panels 12 and 14 with sufficient strength so that the panels will not delaminate or debond from the adhesive during microfilm strip insertion or during general usage. A single bond 18 should require an initial peak force of at least 50 grams to pull the laminant apart using a standard peal adhesion test, which involves using an Instron® instrument or other similar instrument to measure the bond strength by pulling the laminant apart.

The bonds 18 are generally designed to be of substantially the same thickness as or preferably slightly thinner than the microfilm strips that will be inserted into the chambers 22 so that the jackets with the microfilm strips inserted therein can undergo efficient contact printing, i.e., the sensitive duplicating film will be in virtual contact with the microfilm contained in the jacket during contact-printing. Moreover, the bonds 18 are spaced apart so that the resulting chambers 22 have a substantially similar width compared to the microfilm strip to accommodate microfilm strips of a given size, such as 16 mm film.

The bottom panel 14 is generally of a heavier gauge film than the top panel 12 and is generally somewhat wider than top panel 12 to provide adequate room for the title strip 16, which is generally coated with a translucent coating 24 for printing a title on the jacket, which will in turn title any resulting microfiche made therefrom through contact-printing. The top panel 12 is preferably about one mil or less in thickness to facilitate contact-printing, whereas bottom panel 14 is preferably about 3 mils or less to give body to the jacket 10. Preferably the top and bottom panels are made of a polyester such as Mylar®, Milinex®, Celanex®, or Caladex®.

The generally rectangular slots 20 are preferably punched into the bottom panel 14 adjacent a front end 26 of each chamber opening 28 so that the microfilm can be readily inserted into the chambers 22 of the jacket 10 using well-known microfilm strip insertion devices.

Figure 3:
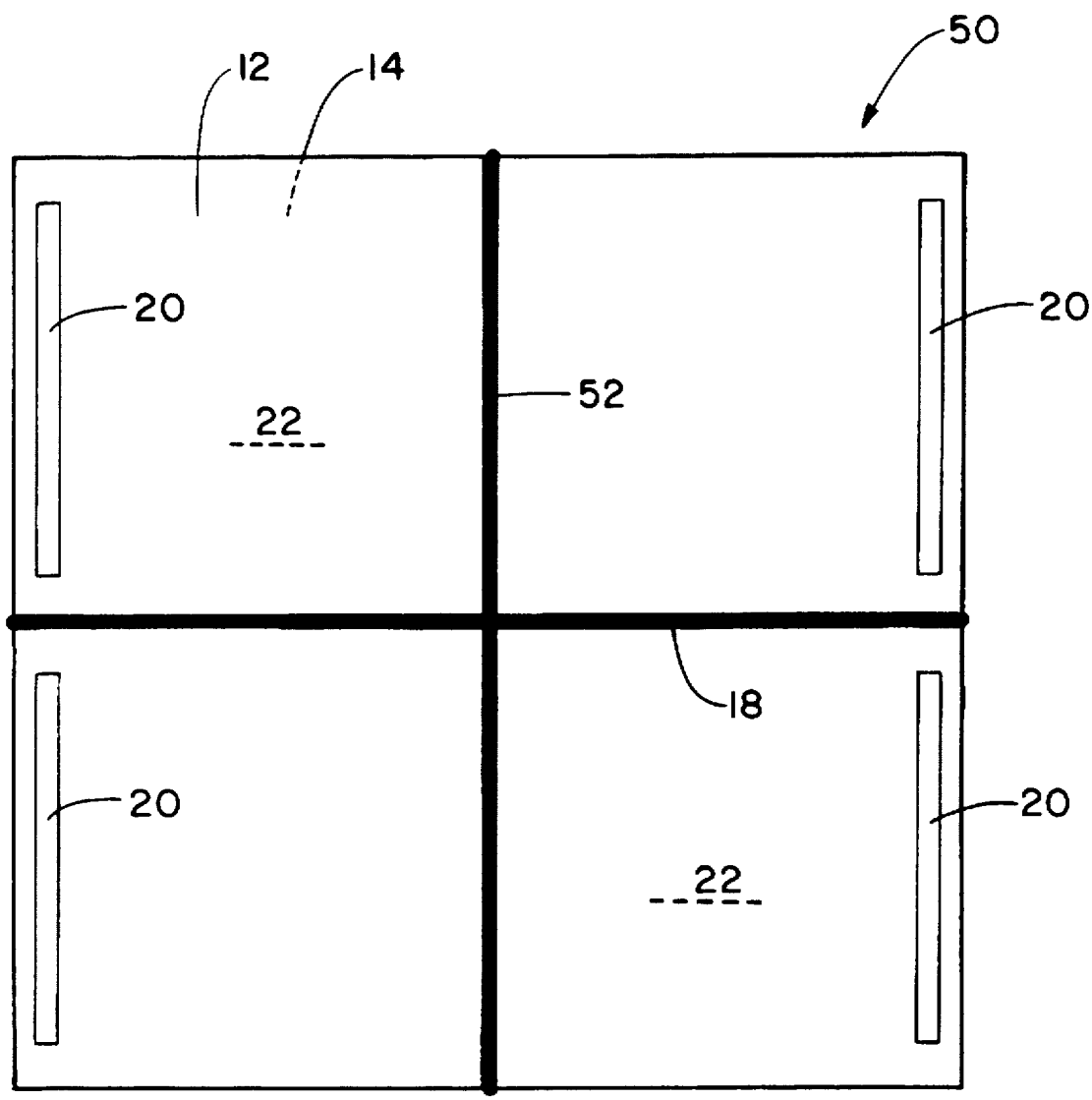
FIG. 3 is a plan view of a second embodiment of the jackets of this invention.

Referring now to FIG. 3, a second embodiment of a jacket of this invention, generally 50, for holding optical disks, CDs and/or diskettes is shown. The jacket 50 includes a top panel 12, a bottom panel 14, one longitudinal bond 18, one lateral bond 52, and four slots 20. The inclusion of a lateral bond is necessary so that the chambers 22 are closed on three sides and may be closed on all four sides with the slot being the only access into the chambers. Again, the portions of the panel that will have the lateral bonds will also preferably be ozone pre-treated. Generally, the bonds of this type of jacket are preferably thicker and wider so that optical disks, CDs or diskettes are properly retained in the jacket and the slots are longer and wider so that the CDs can be easily inserted into and removed from the jacket. Of course, CD and diskette jacket 50 can be single chambered or multi-chambered, as shown in FIG. 3, depending on the type of jacket desired.

Referring now to FIGS. 4–7, the process of the present invention will be described in terms of an apparatus generally 70 shown schematically as including first and second web dispensers 72a–b having first and second rolls 74a–b of first (bottom) and second (top) webs 76a–b associated therewith and a first and second web guide 78a–b. The webs 76a–b are unrolled from their respective rolls 74a at a controlled rate by their respective dispensers 72a–b through their respective web guides 78a–b and feed to all the zones of the apparatus 70.

The apparatus 70 also includes an ozone unit 80 (also see FIG. 6), a hot melt adhesive application unit 100 (also see FIG. 5), a compression unit 120, a slot punching unit 120, a sheeting unit 160, a compressed air supply unit 180 (shown in FIG. 6), a tensioning system 200, a drive unit 220, a web rotation unit 240, optional title strip coating, color coding or flexographic printing units 260, a jacket stacking unit 280, an infeed unit 300, and an outfeed unit 320.

The apparatus 70 is a modified Flexo Press Model LC 1004 Colors made by Aqua-Flex, Systems Inc. available from Westron a division of Didde Web Press Corporation of Ft. Launderdale, Fla.

The ozone unit 80 includes an ozone generator 82, two ozone dispensing manifolds 84a–b attached to an ozone generator by appropriate tubing 86. The manifolds 84a–b each includes a plurality of jets 88 having jet exits 90 positioned close to web surfaces 92a–b of the webs 76a–b. The jets 88 focus ozone streams (not shown) at portions of the web surfaces 92a–b that correspond substantially with the regions of the webs surfaces 92a–b where a plurality of adhesive ribbons 94 are deposited directly onto the web surface 92a of the bottom web 76a. The closeness of the jets to the web surface is generally less than about 1" and preferably less than about ½". However, the closeness of the jets to the surface will to some extent depend on mechanical requirements, the flow rate the ozone generator and the diameter of the exits of the jets. The ribbons 94 are substantially flat after application with and have a width and height after application that is within about 10% greater than the width and height the ribbons will have after going through the compression unit.

The ozone manifolds 84a–b are preferably located prior, and preferably just prior, to where the adhesive contacts the webs 76a–b. The close proximity of the ozone pre-treatment and where the webs come in contact with the adhesive is to ensure that the ozone activated portions of the surfaces 92a–b come into near immediate contact with the adhesive ribbons 94. Preferably, the ozone manifolds 84a–b are located as close to the adhesive application unit 100 as is mechanically possible and preferably immediately before the web surfaces 92a–b make contact with the adhesive system. Generally, the ozone applicators are located within about 6" of where the web surface comes in contact with the adhesive so that the surfaces are still newly activated by ozone.

The adhesive application unit 100 (detailed in FIG. 5) includes a heated adhesive holding tank 102 having a mechanical pump 104 (not shown) associated therewith. The unit 100 also includes a heated adhesive supply line 106, and a manifold 108. The manifold 108 has a plurality of nozzles 110 associated therewith. The pump 104 pumps the adhesive through the line 106 from the tank 102 to the manifold 108 into the nozzles 110 and out nozzle exits 112 onto the web surface 92a of the bottom web 76a. The application unit 100 is a modified hot melt applicator available from Nordson Corporation.

A set of two nozzle 110 has an air actuated control valve 114 associated therewith. The control valves 114 are controlled by the pumping rate of the pump 104 and by air pressure supplied by the compressed air unit 180, which in turn controls the rate at which adhesive ribbons 94 are pumped onto the bottom web surface 92a. The adhesive system is fully melted in the heated holding tank 102 and keep in the fully melted stated in the heated line 106 so that the adhesive system is in a fully melted state when it exits nozzle exits 112.

Figure 7:
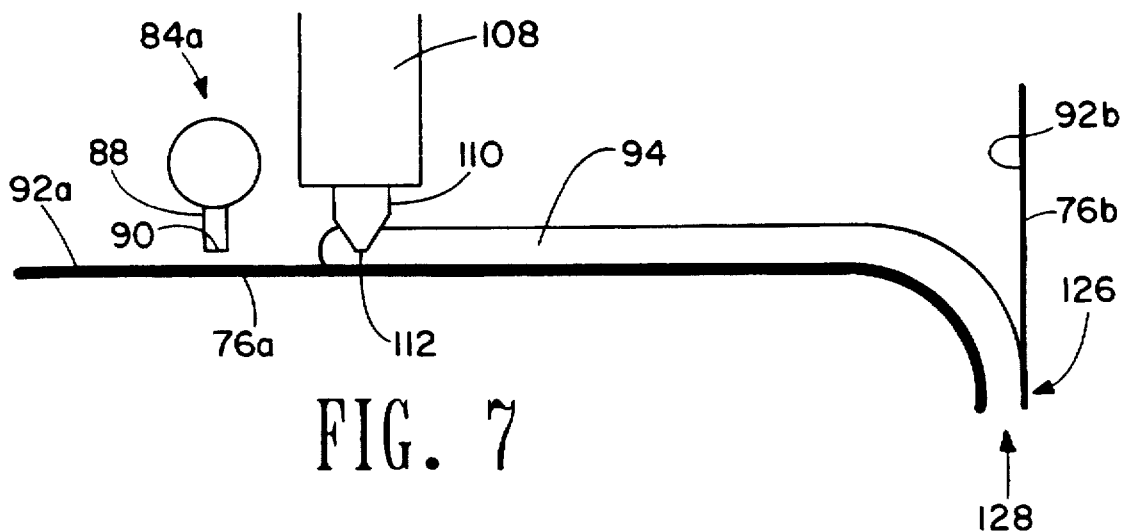
FIG. 7 is a blowup of the ozone unit and the adhesive application unit of FIG. 4.

Moreover, as with the jets 88, the nozzle exits 112 are located very close (generally less than about 6 mils and preferably less than about 3 mils) to the web surface 92a so that the adhesive ribbons 94 actually rises above the nozzle exits 112 as the adhesive flows out of the nozzles 110 through the exits 112 to form the substantially flat ribbons 94 (as shown in detail in FIG. 7).

The size of the plurality of jets 88 and of the plurality of nozzles 110 (i.e., the number of jets and nozzles) are preferably the same, but can be different. The number of jets and/or nozzles and their spacing will depend on the final shape of the desired product. For jackets designed to hold and/or protect strips of material, the number and spacing of jets and nozzles will be such that five chambers are produced, wide enough to hold the strips; while for jackets designed to hold other objects, one, two or three or more chambers are provided.

Because the adhesive first comes into contact with the surface 92a of the bottom web 76a, the first ozone manifold 84a is closely associated with the adhesive application manifold 108 so that the ozone treatment of the portions of the web 76a that will correspond substantially to the ribbons 94 will occur immediately before the adhesive ribbons 94 are pumped onto the ozone treated portions of the surface 92a. Shortly after the ribbons 94 are pumped from the manifold 108 onto the web surface 92a, the web 76a is advanced to the compression unit 120 where it is then mated with the top web 76b to form a laminated web 116. The second ozone manifold 84b is located prior to where the top web 76b enters the compression unit 120 so that the ozone will activate portions of the surface 92b of the top web 76b corresponding to where the ribbons 94 will contact the top web 76b.

The compression unit 120 preferably includes one chilled roller 122 and one un-chilled roller 124 where the chilled roller 122 is designed to slightly cool the bottom web 76a as the web enters and passes through a compression zone 126 formed between the rollers 122 and 124. The cooling effect help to begin setting-up the adhesive. The compression zone 126 is controlled by a gap 128 (see FIG. 7) between the rollers 122,124, which is thought to help bond the hot melt adhesive ribbons to the webs to form the laminant 116. The gap 128 can be adjusted to ensure that sufficient force is applied to the webs with the ribbons interposed therebetween to facilitate good adhesive contact between the treated stripes of the webs and the adhesive ribbons. The compression zone 126 is also designed to ensure that the substantially flat adhesive ribbons 94 will be of a desired thickness.

The slot punch unit 140 includes a male roller 142 having a plurality of protruding punch members 144 associated therewith and a female roller 146 having a plurality of receiving slots 148 and a vacuum system 150 (not shown) for removing the punched out web pieces. The protruding punch members 144 of the male roller 142 and the receiving slots 148 of the female roller 146 are designed to mate because the two rollers are synchronized so that the punches are received into the receiving slots as the web advances through the unit resulting in slots being punched into the web. The rollers are designed so that the punch slots will appear in the front of the jackets in the bottom web as shown in FIG. 1.

From the compression unit 120, the laminant 116 is advanced to the sheeting unit 160, which includes a cutting roller 162 having at least one cutting members 164 extending the length of the roller 162. The sheeting members 164 are positioned on the sheeting roller 162 so that the laminant 116 will be cut into the desired jacket length. Generally, the sheeting roller 162 has two cutting members 164 located on opposite sides of the sheeting roller 162. Of course, the sheeting roller could have more than two cutting member Obviously, each sheeting roller with its associated cutting members are sized and the cutting members are located on the sheeting roller such that the resulting product is of the correct size.

Figure 6:
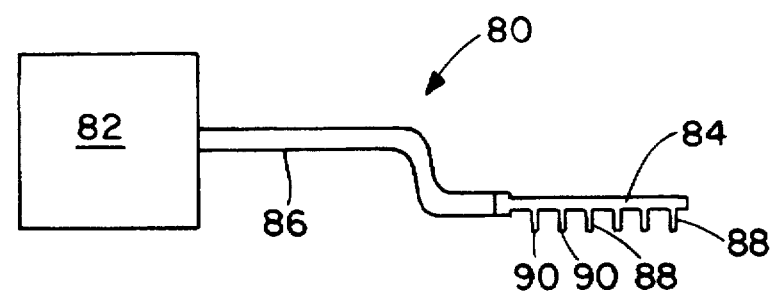
FIG. 6 is a schematic diagram of the ozone pre-treatment unit of FIG. 4.

The compressed air supply unit system 180 includes an air compressor 182, which supplies air to the apparatus at different units to ensure proper functioning. The system 180 also includes hoses 184 connecting the compressor 182 to the various units or stations as shown in FIG. 6. The compressor 182 supplies compressed are to the valves 114 and to the web rotation unit 240.

The tensioning system 200 includes air actuated braking disks 202 connected to the air compressor 182 and associated with the dispensers 72a–b. Because of the inter-related nature of the apparatus 10, the tensioning system 200 must be carefully controlled so that a tension of between about 8 lbs and about 12 lbs are maintained on the webs at all units or stations. The tension on the webs is controlled by the pressure on the braking disks 202 associated with the dispensers 72a–b. As the rolls 74a–b lighten (i.e., as the web material is used), the amount of air pressure supplied to the braking disks 202 must be continually decreased to maintain the necessary tension on the webs.

The entire apparatus 70 is operated by the drive unit 220, which includes an electric motor 222 (not shown) and a continuous drive shaft 224 with transfer gear boxes or power couplers 226 (not shown) at each station or unit. The drive unit 220 operates such that every station performs its function without adversely affecting the final product structure and form. The drive unit 220 also has associated with it the infeed and outfeed units 300 and 320, respectively. These units, which include two rollers are the primary web drive mechanisms within the drive unit 220.

The web rotation unit 240 includes a set of air actuated web rotation bars 242 (not shown) as is well known in the art. The bars take the web through a 180° rotation so that a front edge 244 of a surface 246 opposite the surface 92a of the bottom web 76a faces back and the surface 92a which prior to rotation faced the ground now faces up.

Figure 4:
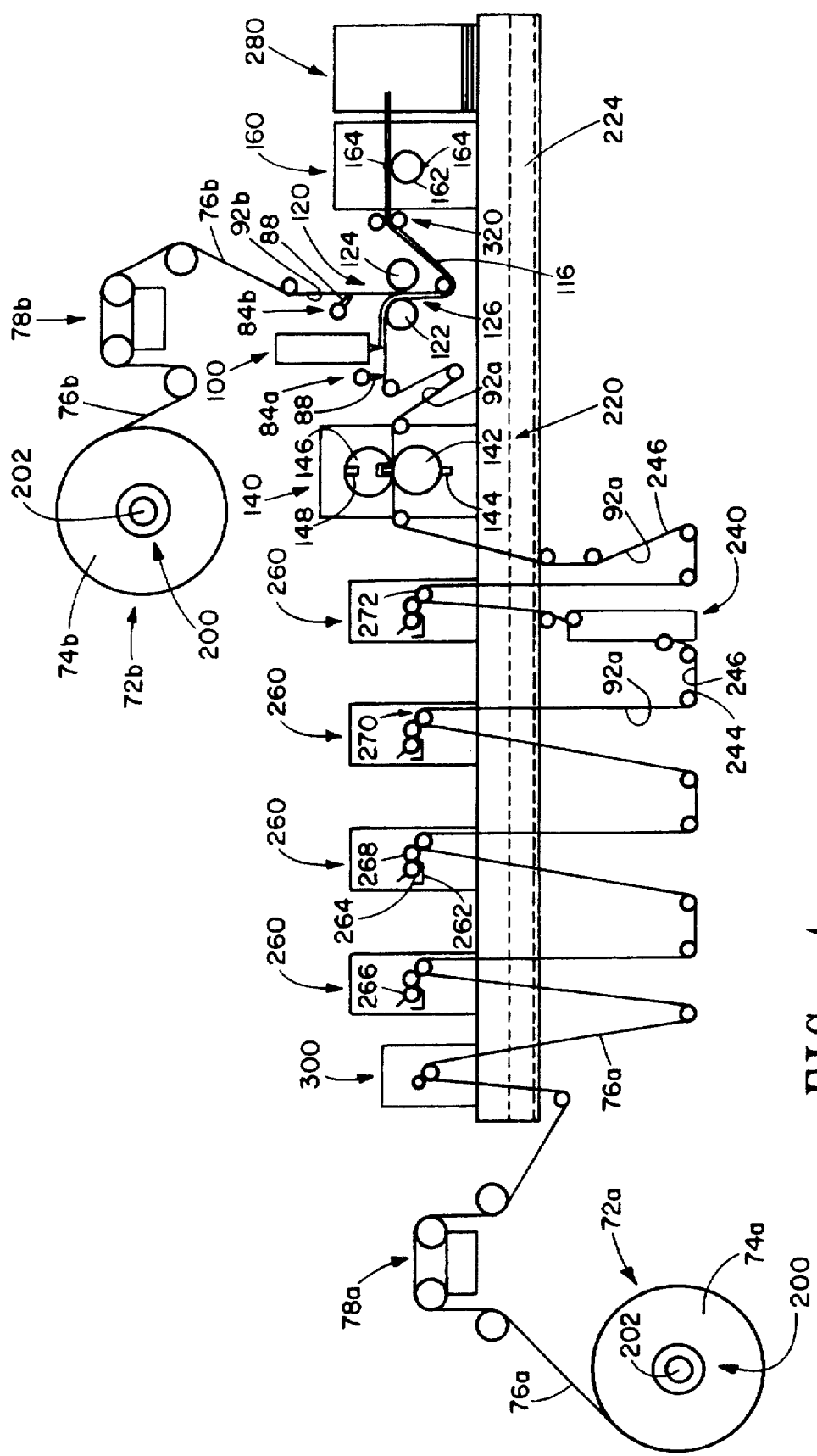
FIG. 4 is a schematic diagram of a machine for mass-producing the jacket.
Figure 5:
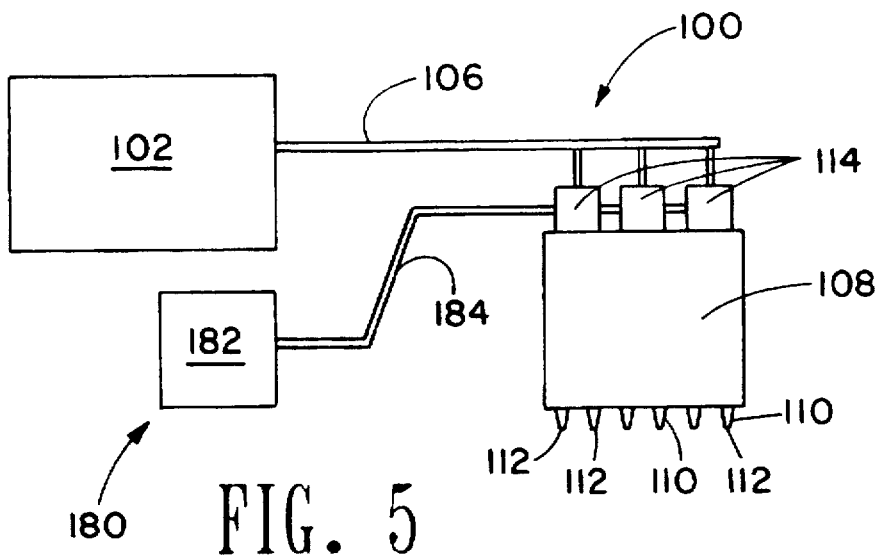
FIG. 5 is a schematic diagram of the adhesive application unit of FIG. 4.

Optionally, the apparatus 70 can include at least one functioning flexographic printing station 260 (four are shown in FIG. 4). Each station 260 has a supply 262 tank, which transfers a coating material 264 onto a coating roller 266, which in turn transfers the coating 264 onto a transfer roller 268, which in turn transfer the coating to the surface 246 of the bottom web 76a as the web 76a passes through a nip 270 between the transfer roller 268 and a third roller 16 (as shown in FIG. 1) or print indexing information. The form of the coating transferred to the web is determined by the details etched into the roller 266 which picks up the coating material 264. Excess coating material is removed from the roller 266 by a blade 274. Each one of these stations 260 can be idled during standard operation.

These optional coating units are generally performed prior to the web undergo the 180° rotation as it passes through the web rotation unit or station 240. However, one of the flexographic printing station can be located after the web rotation unit 240, so that a coating can be applied to the surface 92a prior to adhesive application. Once the web has been flipped over, its proceeds to the punching station 140.

The apparatus 70 finally includes the jacket stacking station 280, which simply stacks and collects the jackets 10 as then are cut from the laminant 116 in the sheeting unit 160.

The bottom web advances from its dispenser through a wave guide to the in feed unit and then advances to one or more printing stations which optionally, can add the title coating, print text onto the web or color code the web. The web is then flipped over so that the top surface becomes the bottom surface and visa-a-versa. The bottom web then advances horizontally to the punching station where the slots in the bottom web are punched.

The bottom web then advances horizontally to a bottom web ozone treating station, which is followed as immediately as is mechanically possible by the adhesive application station where the fully melted adhesive is pumped onto the ozone treated portions of the web surface. The web with the ribbons pumped onto the ozone treated portions of the web is then advanced to the compression station where the top web is laid on top of the bottom web with the ribbons interposed therebetween. But just prior to the compression station, the top web is treated with ozone at portions of the web that correspond substantially to the portions of the web that will contact the adhesive ribbons.

The webs with the ribbons interposed therebetween then advances to the compression station where sufficient compression is applied to the assembly to form an adhesively bonded laminant. The laminant is then advanced to the cutting station where the laminant is sectioned into individual jackets. Because the ribbons are generally flat and have nearly their final shape, the compression, although effecting the ribbon thickness and width, is primarily intended to ensure that both ozone treated portions of each web comes into firm adhesive contact with the ribbons.

Experimental

Several runs of jackets were made and tested and the strength of the adhesive bond between the webs and the adhesive ribbons was measured by a standard peel test to determine the influence the toluene sulfonamide and the ozone pre-treatment have on the bond strength of copolyester adhesives.

The following table shows the adhesive systems prepared and the test results for a single ribbon peal test.

| Adhesive System | Initial Peak Force (g) | Average Sliding Peak (g) |
|---|---|---|
| copolyester | 73.64 | 82.56 |
| copolyester/ 5% toluene sulfonamide | 45.86 | 63.72 |
| copolyester/ 10% toluene sulfonamide | 62.21 | 76.59 |
| copolyester/ ozone treatment (bottom web) | 116.81 | 90.91 |
| copolyester/ 5% toluene sulfonamide/ ozone treatment (bottom web) | 151.88 | 197 |

It is clear from the table, that the sulfonamide by itself causes a measurable decrease in adhesion, while the ozone only shows a 56% increase in initial peak force and a 10% increase in average sliding peak force. The significant result is achieved for the combined ozone treatment and 5% sulfonamide/copolyester adhesive system which shows a 106% improvement in initial peak force and a 139% improvement in average sliding peak force for a single ribbon.

While there has been shown and described a preferred embodiment of a multi-channel transparent microfilm jacket in accordance with the invention, it will be appreciated that many changes and modifications maybe made therein without, however, departing from the essential spirit thereof.

I claim:

1. A transparent jacket for accommodating flat objects comprising:

(a) top and bottom panels in superposed relation formed of flexible polymeric film and ozone pre-treated longitudinal regions associated with a top surface of the bottom panel and corresponding regions associated with a bottom surface of the top panel;

(b) a plurality of bonds adhesively bonded to the ozone treated regions of the top and bottom panels forming a set of chambers for receiving the objects where the bonds comprise an adhesive system including 100% to about 50% of at least one synthetic resin and from about 0% to about 50% of at least one bonding agent; and (c) a set of slots associated with each chamber for easily inserting the object into the chambers.

2. The jacket of claim 1, wherein the bonds are substantially parallel and disposed longitudinally.

3. The jacket of claim 1, wherein the bonds include at least one longitudinally bonds and at least one lateral bonds and where the longitudinal bonds are substantially parallel and the lateral bonds are substantially parallel.

4. The jacket of claim 1, wherein the adhesive system includes from about 99% to about 60% of at least one synthetic resin and from about 1% to about 40% of at least one bonding agent.

5. The jacket of claim 1, wherein the adhesive system includes from about 95% to about 70% of at least one synthetic resin and from about 5% to about 30% of at least one bonding agent.

6. The jacket of claim 1, wherein the panels are formed of a polyester.

7. The jacket of claim 1, wherein the top panel is less than about one mil thick.

8. The jacket of claim 2, wherein the bottom panel is between about 2 mils and about 5 mils thick.

9. The jacket of claim 1, wherein the bonds are substantially the same thickness as the object to be inserted into the chambers of the jacket.

10. A transparent jacket for accommodating flat objects comprising:

(a) top and bottom panels in superposed relation formed of flexible polymeric film and ozone pre-treated longitudinal regions associated with a top surface of the bottom panel and corresponding regions associated with a bottom surface of the top panel; and (b) a plurality of bonds adhesively bonded to the ozone treated regions of the top and bottom panels forming a set of chambers for receiving the objects where the bonds comprise an adhesive system including 100% to about 50% of at least one synthetic resin and from about 0% to about 50% of at least one bonding agent.

11. The jacket of claim 10, wherein the bonds are substantially parallel and disposed longitudinally.

12. The jacket of claim 10, wherein the bonds include at least one longitudinally bonds and at least one lateral bonds and where the longitudinal bonds are substantially parallel and the lateral bonds are substantially parallel.

13. The jacket of claim 10, wherein the adhesive system includes from about 99% to about 60% of at least one synthetic resin and from about 1% to about 40% of at least one bonding agent.

14. The jacket of claim 10, wherein the adhesive system includes from about 95% to about 70% of at least one synthetic resin and from about 5% to about 30% of at least one bonding agent.

15. The jacket of claim 10, wherein the panels are formed of a polyester.

16. The jacket of claim 10, wherein the top panel is less than about one mil thick.

17. The jacket of claim 11, wherein the bottom panel is between about 2 mils and about 5 mils thick.

18. The jacket of claim 10, wherein the bonds are substantially the same thickness as the object to be inserted into the chambers of the jacket.

* * * * *